United States Patent
Ito et al.

(10) Patent No.: US 7,944,476 B2
(45) Date of Patent: May 17, 2011

(54) IMAGE PROCESSING DEVICE, IMAGE PROCESSING SYSTEM, COMPUTER CONTROL METHOD, AND INFORMATION STORAGE MEDIUM

(75) Inventors: Junpei Ito, Tokyo (JP); Hiroki Kato, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1013 days.

(21) Appl. No.: 11/759,369

(22) Filed: Jun. 7, 2007

(65) Prior Publication Data

US 2007/0296825 A1 Dec. 27, 2007

(30) Foreign Application Priority Data

Jun. 26, 2006 (JP) ................................ 2006-175806

(51) Int. Cl.
*H04N 5/228* (2006.01)
(52) U.S. Cl. .................. 348/208.16; 382/103
(58) Field of Classification Search ............. 348/208.16
See application file for complete search history.

(56) References Cited

U.S. PATENT DOCUMENTS

| | | | | |
|---|---|---|---|---|
| 5,877,809 A * | 3/1999 | Omata et al. | ................. | 348/345 |
| 6,067,114 A * | 5/2000 | Omata et al. | ................. | 348/345 |
| 6,188,776 B1 * | 2/2001 | Covell et al. | ................. | 382/100 |
| 6,215,890 B1 * | 4/2001 | Matsuo et al. | ................ | 382/103 |
| 6,229,568 B1 * | 5/2001 | Kawaguchi et al. | .......... | 348/350 |
| 6,400,828 B2 * | 6/2002 | Covell et al. | ................. | 382/100 |
| 6,529,630 B1 * | 3/2003 | Kinjo | ............................. | 382/190 |
| 6,597,801 B1 * | 7/2003 | Cham et al. | ................... | 382/103 |
| 7,043,059 B2 * | 5/2006 | Cheatle et al. | ................ | 382/112 |
| 7,397,500 B2 * | 7/2008 | Yost et al. | ................. | 348/208.99 |
| 7,564,476 B1 * | 7/2009 | Coughlan et al. | .......... | 348/14.08 |
| 7,570,878 B2 * | 8/2009 | Kodaira et al. | ................. | 396/50 |
| 2001/0028731 A1 * | 10/2001 | Covell et al. | ................. | 382/118 |
| 2001/0036860 A1 * | 11/2001 | Yonezawa | ....................... | 463/30 |
| 2003/0133599 A1 * | 7/2003 | Tian et al. | ..................... | 382/118 |
| 2003/0198367 A1 * | 10/2003 | Hartmann et al. | ............ | 382/118 |
| 2004/0100572 A1 * | 5/2004 | Kim | ......................... | 348/333.01 |
| 2004/0207743 A1 * | 10/2004 | Nozaki et al. | ............ | 348/333.12 |
| 2005/0128312 A1 * | 6/2005 | Fredlund et al. | ............ | 348/222.1 |
| 2005/0213818 A1 * | 9/2005 | Suzuki et al. | ................. | 382/190 |
| 2006/0018516 A1 * | 1/2006 | Masoud et al. | ............... | 382/115 |
| 2006/0098865 A1 * | 5/2006 | Yang et al. | .................... | 382/159 |
| 2006/0126894 A1 * | 6/2006 | Mori | .............................. | 382/103 |
| 2007/0002157 A1 * | 1/2007 | Shintani et al. | .......... | 348/333.06 |
| 2008/0037836 A1 * | 2/2008 | Chen et al. | .................... | 382/118 |
| 2008/0123968 A1 * | 5/2008 | Nevatia et al. | ................ | 382/228 |
| 2008/0273097 A1 * | 11/2008 | Nagashima | .............. | 348/231.99 |
| 2008/0297617 A1 * | 12/2008 | Jeong | ......................... | 348/222.1 |
| 2009/0066815 A1 * | 3/2009 | Nozaki et al. | ............. | 348/231.99 |
| 2009/0097739 A1 * | 4/2009 | Rao et al. | ..................... | 382/159 |

* cited by examiner

*Primary Examiner* — Sath V Perungavoor
(74) *Attorney, Agent, or Firm* — Katten Muchin Rosenman LLP (57) ABSTRACT

To enable a prompt switching operation by a user. An image processing device connected to an image capturing section has a process execution section for executing any of a plurality of processes, obtains area specification data for specifying an area where the user is shown in the image, based on a difference between the images sequentially captured by the image capturing section images, and switches a process to be carried out by the process execution section, depending on the position of an edge of the area specified by the area specification data obtained.

11 Claims, 9 Drawing Sheets

IMAGE PROCESSING DEVICE, IMAGE PROCESSING SYSTEM, COMPUTER CONTROL METHOD, AND INFORMATION STORAGE MEDIUM

BACKGROUND OF THE INVENTION

1. Field of the Invention

The present invention relates to an image processing device, an image processing system, a computer control method, and an information storage medium.

2. Description of the Related Art

There is available a computer for providing a plurality of application programs and a plurality of functions in a single application program. Generally, the user of such a computer switches application programs, functions, and so forth by operating an input device such as a keyboard, a controller, a mouse, or the like.

The present inventor has conceived a technique for improving the operation to switch functions and application programs to achieve smoother switching. The present invention has been conceived in view of the above, and aims to provide an image processing device, an image processing system, a computer control method, and an information storage medium for achieving smoother switching operation by a user.

SUMMARY OF THE INVENTION

In order to solve the above described problems, according to one aspect of the present invention, there is provided an image processing device connected to image capturing means for sequentially capturing images of a user, comprising process execution means for carrying out any of a plurality of processes to be carried out based on at least one of the images sequentially captured by the image capturing means; area specification data acquisition means for obtaining area specification data for specifying an area where the user is shown in the image, based on a difference between the images sequentially captured by the image capturing means; and process switching means for switching a process to be carried out by the process execution means, depending on a position of an edge of the area specified by the area specification data obtained by the area specification data acquisition means.

According to another aspect of the present invention, there is provided a method for controlling a computer (for example, a personal computer, a server computer, a game device, a portable digital assistant, and so forth, which is similarly applied to the following) connected to image capturing means for sequentially capturing images of a user, the method comprising a process execution step of carrying out one of a plurality of processes to be carried out based on at least one of the images sequentially captured by the image capturing means; an area specification data acquisition step of obtaining area specification data for specifying an area where the user is shown in the image, based on a difference between the images sequentially captured by the image capturing means; and a process switching step of switching a process to be carried out at the process execution step, depending on a position of an edge of the area specified by the area specification data obtained at the area specification data acquisition step.

According to still another aspect of the present invention, there is provided an information storage medium storing a program for causing a computer connected to image capturing means for sequentially capturing images of a user to function as process execution means for carrying out any of a plurality of processes to be carried out based on at least one of the images sequentially captured by the image capturing means; area specification data acquisition means for obtaining area specification data for specifying an area where the user is shown in the image, based on a difference between the images sequentially captured by the image capturing means; and process switching means for switching a process to be carried out by the process execution means, depending on a position of an edge of the area specified by the area specification data obtained by the area specification data acquisition means.

The information storage medium may be a CD-ROM (Compact Disk—Read Only Memory), a DVD-ROM (Digital Versatile Disk—Read Only Memory), a memory card, and any other computer readable information storage medium.

An image capturing means such as a camera or the like is connected to the image processing device according to the present invention. The image capturing means sequentially captures images, and the captured images are input to the image processing device. The image processing device specifies an area, within the captured image, where the user is shown, based on the input image. The specified area may show all or a part of the user. The image processing device switches the process to be carried out depending on the position of the specified area in the captured image.

In the present invention, the image processing device may switch the process to be carried out, depending on the position of the area where the user is shown in the captured image. With this arrangement, the user can promptly switch the process to be carried out by the image processing device by changing the position where the user themselves are shown in the captured image.

In the above, the area specification data acquisition means may include position coordinate storage means for storing, as the area specification data, position coordinates of a plurality of control points set on an edge of the area, and position coordinate update means for updating the position coordinates of each of the control points based on a difference between the images sequentially captured by the image capturing means. With this arrangement, the image processing device can readily know the position of the area where the user is shown in the captured image based on the position of the control point placed on the outline of the area.

Also, the process switching means may include first determination means for determining whether or not a predetermined condition is satisfied, based on a distance between one side of the image and a position of an edge of the area specified by the area specification data, and switching the process to be carried out by the process execution means, based on a result of the determination by the first determination means.

With this arrangement, the image processing device switches the process to be carried out, depending on the result of determination as to whether or not the distance between one side of the captured image and the edge of the area where the user is shown in the captured image is within a predetermined range. With this arrangement, the user can promptly switch the process to be carried out by the image processing device by changing the distance between one side of the captured image and the edge of the area where the user is shown in the captured image.

Also, the process switching means may include second determination means for determining whether or not the area specified by the area specification data is generated at a side of the image, and switch the process to be carried out by the process execution means, based on a result of the determination by the second determination means.

With this arrangement, the image processing device can switch the process to be carried out when the area where the user is shown is generated at the side of the captured image. With this arrangement, the user can promptly switch the process to be carried out by the image processing device by arranging such that at least a part of the user themselves is newly shown in the captured image.

According to yet another aspect of the present invention, there is provided an image processing system, comprising image capturing means for sequentially capturing images of a user, and an image processing device, wherein the image processing device includes process execution means for carrying out any of a plurality of processes to be carried out based on at least one of the images sequentially captured by the image capturing means, captured image portion determination means for determining which portion of the user's body is shown in each of the sequentially captured images, and process switching means for switching a process to be carried out by the process execution means, depending on the portion determined by the captured image portion determination means.

With this arrangement, the image processing system determines the portion of the user, which is shown in the captured image, and switches the process to be carried out by the image processing device, based on the result of the determination.

In the above, the image capturing means may include an image capturing direction adjustment mechanism for adjusting an image capturing direction, and the captured image portion determination means may include image capturing direction detection means for detecting an image capturing direction of the image capturing means, which is adjusted by the image capturing direction adjustment mechanism, and determine which portion of the user's body is shown in the captured image, depending on the image capturing direction detected by the image capturing direction detection means.

With this arrangement, the image processing system determines the portion of the user, which is shown in the captured image, based on the image capturing direction of the image capturing means, and can promptly switch the process to be carried out by the image processing device, based on the result of the determination.

According to yet another aspect of the present invention, there is provided an image processing device connected to image capturing means, the image processing device comprising process execution means for carrying out any of a plurality of processes; area specification data acquisition means for obtaining area specification data for specifying an area where the user is shown in the image, based on a difference between the images sequentially captured by the image capturing means; and process switching means for switching a process to be carried out by the process execution means, depending on a position of an edge of the area specified by the area specification data obtained by the area specification data acquisition means.

According to yet another aspect of the present invention, there is provided a control method for a computer connected to image capturing means, the control method comprising a process execution step of executing any of a plurality of processes; an area specification data acquisition step of obtaining area specification data for specifying an area where the user is shown in the image, based on a difference between the images sequentially captured by the image capturing means; and a process switching step of switching a process to be carried out at the process execution step, depending on a position of an edge of the area specified by the area specification data obtained at the area specification data acquisition step.

According to yet another aspect of the present invention, there is provided an information storage medium storing a program for causing a computer connected to image capturing means to function as process execution means for carrying out any of a plurality of processes; area specification data acquisition means for obtaining area specification data for specifying an area where the user is shown in the image, based on a difference between the images sequentially captured by the image capturing means; and process switching means for switching a process to be carried out by the process execution means, depending on a position of an edge of the area specified by the area specification data obtained by the area specification data acquisition means.

According to yet another aspect of the present invention, there is provided an image processing system comprising image capturing means, and image processing device, wherein the image processing device comprises process execution means for carrying out any of a plurality of processes; area specification data acquisition means for obtaining area specification data for specifying an area where the user is shown in the image, based on a difference between the images sequentially captured by the image capturing means; and process switching means for switching a process to be carried out by the process execution means, depending on a position of an edge of the area specified by the area specification data obtained by the area specification data acquisition means.

According to the present invention, the image processing device switches the process to be carried out, depending on the position of the image of an object captured by the image capturing means (an image capturing object). For example, when the user waves their hand in front of the image capturing means, the user can thereby switch the function provided by the image processing device. The process to be carried out by the process execution means may correspond to the respective application programs stored in the image processing device or the respective functions contained in the application program. The unit of the process is not particularly limited.

DESCRIPTION OF THE PREFERRED EMBODIMENTS

In the following, a preferred embodiment of the present invention will be described in detail while referring to the accompanying drawings.

Figure 1:
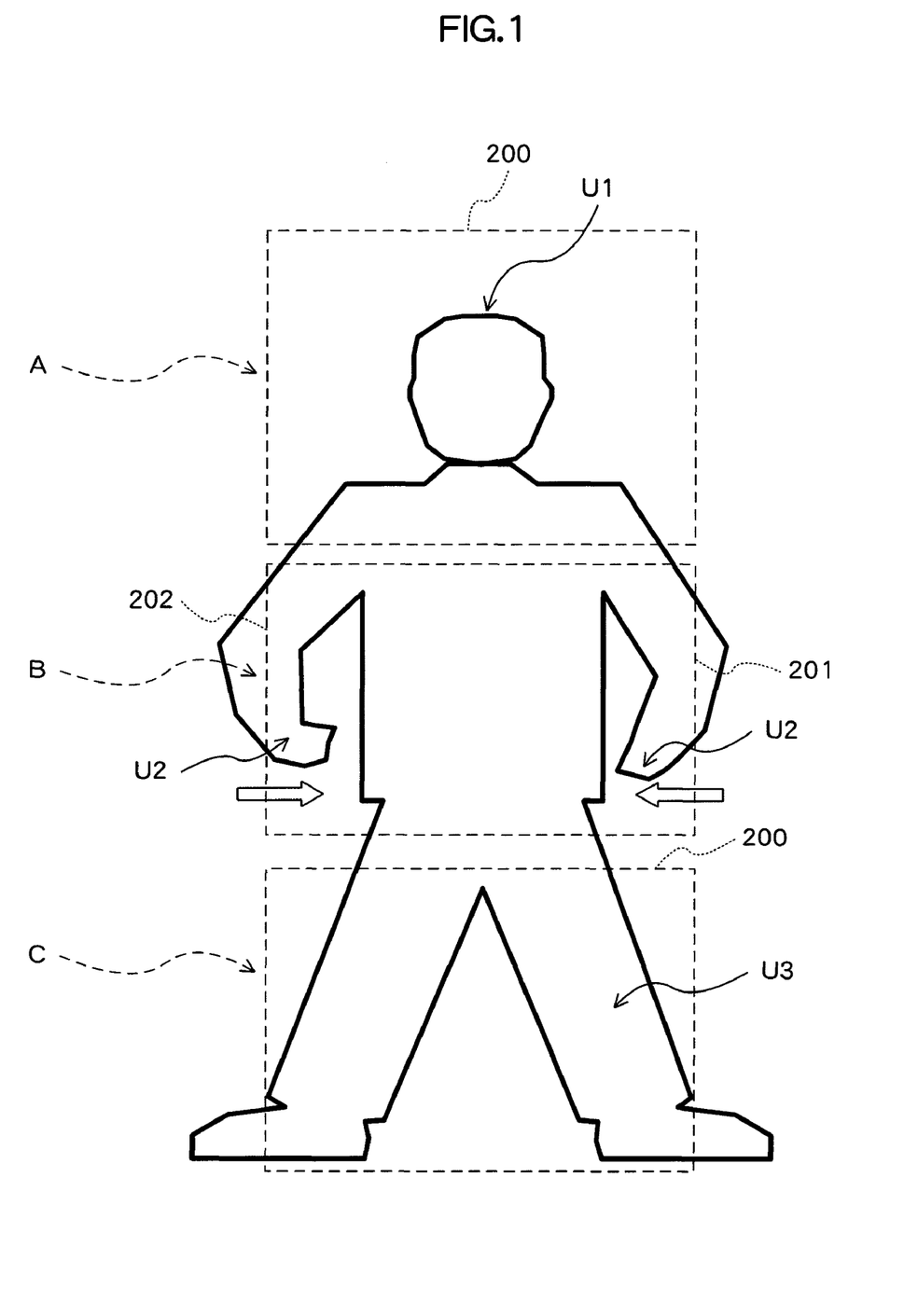
FIG. 1 is a conceptual diagram explaining operation of an image processing device according to the present invention.

With reference to FIG. 1, an operation of an image processing device according to the present invention will be described. In FIG. 1, the areas enclosed by the broken line each represent an image, or a frame, captured using a camera connected to the image processing device.

The image processing device according to this embodiment specifies the position of an area where the user is shown in the captured image, based on a difference, or an inter-frame difference, between frames sequentially captured using a camera, and a difference relative to the background image. Then, according to the specified position of the area where the user is shown, the image processing device switches the process to be carried out. In this embodiment, in particular, the image processing device switches the process to be carried out as described below.

The image processing device determines that the user's head is shown in the captured image A. The image processing device makes this determination because the specified user area U1 is located below the upper side 200 of the captured image A. In this case, the image processing device switches the process mode to a mode for activating an application corresponding to the user's head (hereinafter referred to as a communication mode). In the communication mode, an application relating to the user's head, an application for chatting, and so forth are carried out for recognizing movement of the user's mouth based on the captured image, and causing an avatar corresponding to the user to imitate the movement of the user's mouth.

The captured image B shows the user areas U2 are entering the screen from the right side 201 and the left side 202 thereof. When the specified user area U2 enters the screen from the sides thereof, like the image B, the image processing device determines that the user's arms are shown in the captured image. In this case, the image processing device switches the process mode to a mode for activating an application corresponding to the user's arm (hereinafter referred to as an operation mode). In the operation mode, an application relating to the user's arm is carried out, for example, an application for recognizing the movement of the user's arm based on the captured image and moving the object (for example, an icon, a ball object, and so forth) in the captured image based on the position and the amount of movement of the arm, and so forth.

When the user area U3 shown in the captured image is in contact with the upper side 200 of the captured image, like the captured image C, the image processing device determines that the user's stomach or leg is shown in the captured image. In this case, the image processing device switches the process mode to a mode for activating an application corresponding to the movement of the user's leg (hereinafter referred to as a movement mode). In the movement mode, an application relating to the user's leg is carried out, for example, an application for recognizing the movement of the user's leg and moving the position of the avatar corresponding to the user in the virtual space based on the amount of movement of the user's leg in the right, left, and depth directions, and so forth.

As described above, the image processing device in this embodiment switches the process mode depending on the position of the area where the user is shown in the captured image. The manner of switching the process to be carried out by the image processing device is not limited to the example described above however. For example, the image processing device may switch output display by the image processing device, for example, in addition to the operating application and/or setting, according to the position of the area where the user is shown in the captured image.

A structure of the image processing device according to this embodiment to realize the above-described process is described below.

Figure 2:
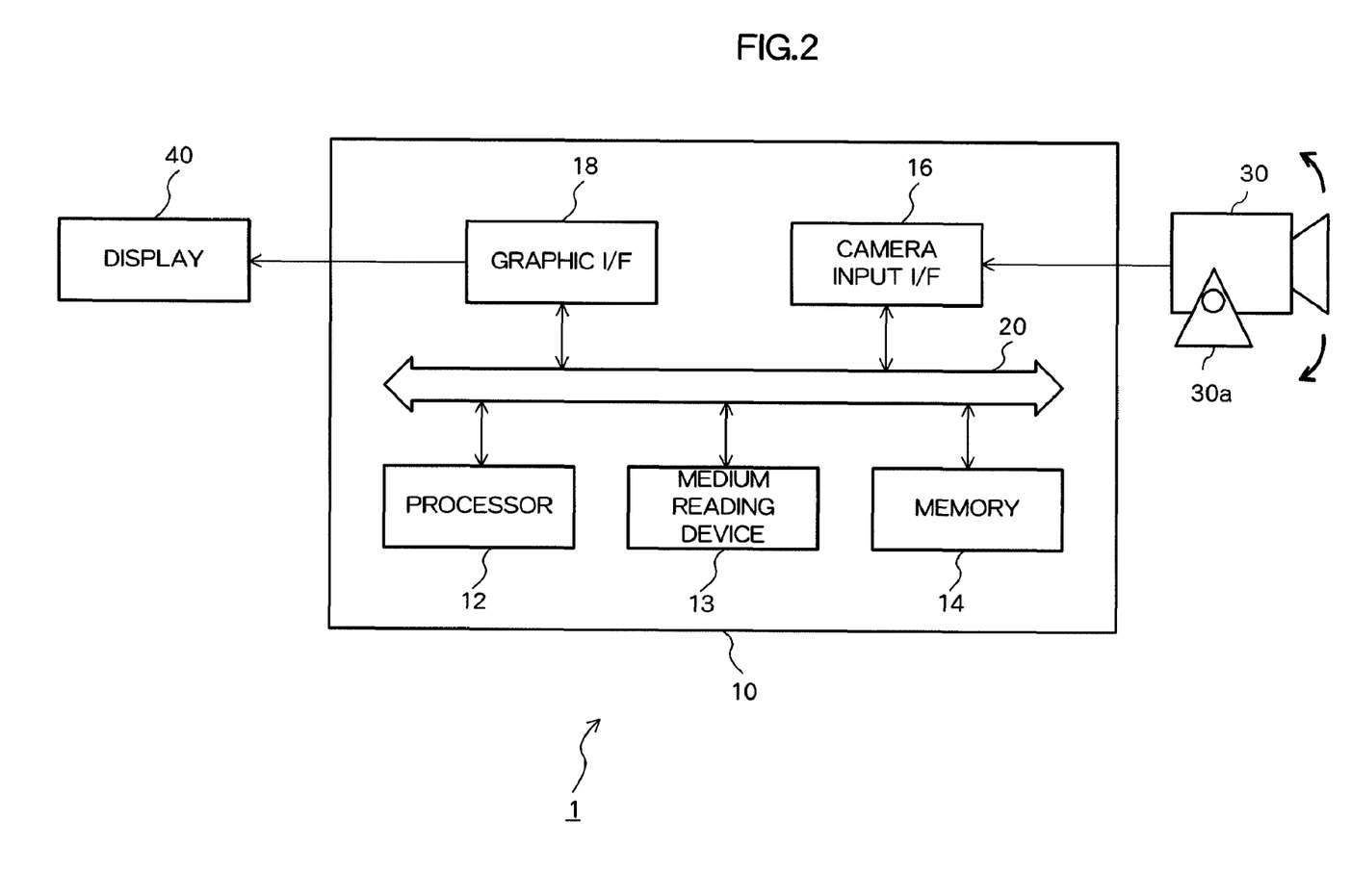
FIG. 2 is a diagram showing a physical structure of the image processing system.

FIG. 2 is a diagram showing a physical structure of an image processing system including the image processing device in an embodiment of the present invention. As shown in FIG. 2, the image processing system 1 comprises an image processing device 10, a camera 30, and a display 40.

The image processing device 10 comprises, as physical structural elements, a processor 12, a medium reading device 13, a memory 14, a camera input interface 16, and a graphic interface 18. The respective sections are mutually connected via a bus 20 for communication.

The processor 12 effects control of the respective sections of the image processing device 10 based on an operating system stored in a ROM and/or a hard disk (both not shown) and a program read from the memory 14. The memory 14 receives a program and data to be written therein, when necessary. The memory 14 is used also as a working memory of the processor 12.

The camera input interface 16 is connected to the camera 30 to receive a data signal, such as image data captured by the camera 30. The camera 30 has an image capturing direction adjustment section 30a for adjusting the image capturing direction.

The graphic interface 18 comprises a video memory, and transfers the image data stored in the video memory to the display 40. The display 40 shows an image based on the received image data.

The medium reading device 13 accepts a computer readable information storage medium, such as a CD-ROM, a DVD-ROM, and so forth, and reads a program from the medium. The processor 12 executes the program read as described above.

Figure 3:
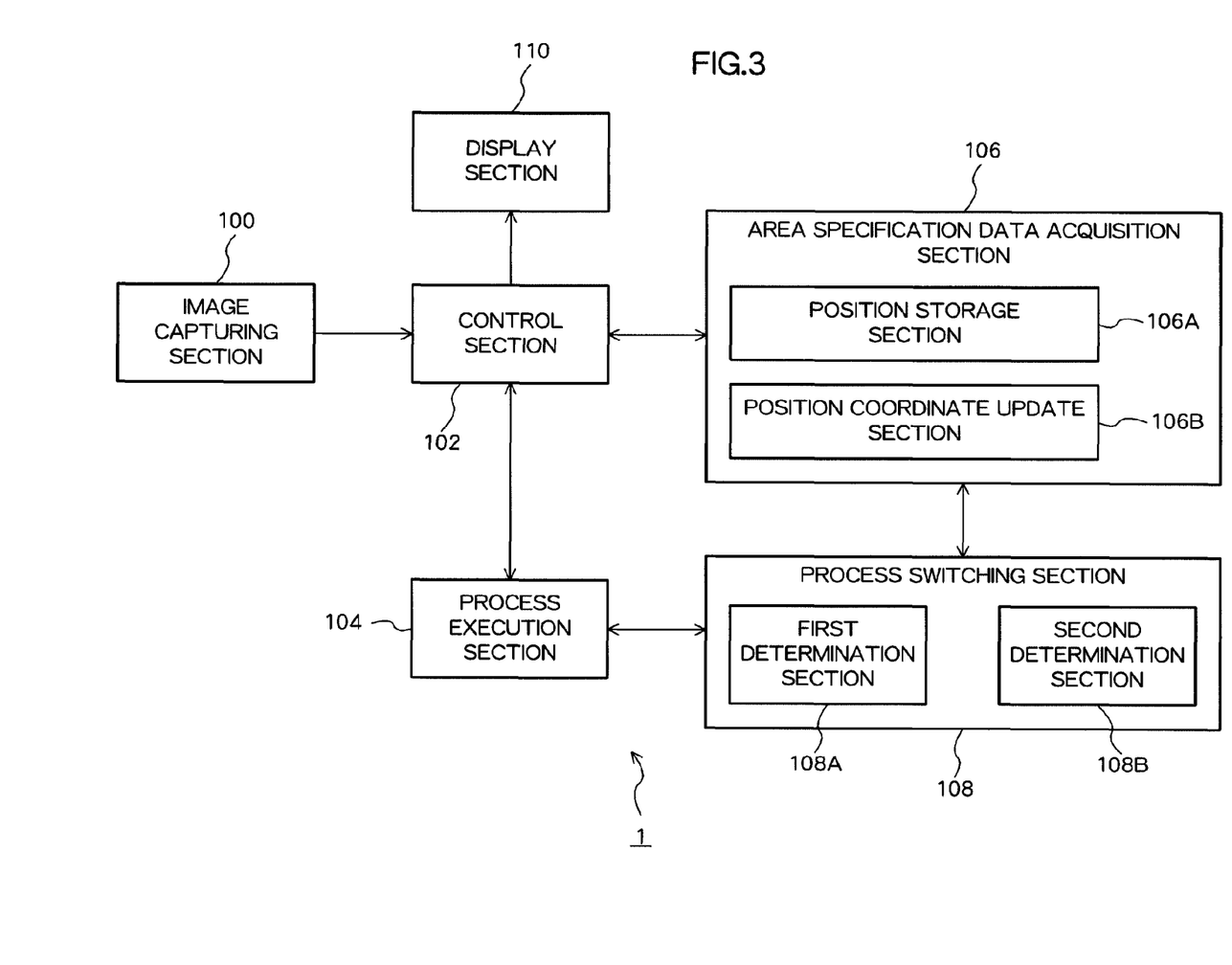
FIG. 3 is a functional block diagram of the image processing system.

FIG. 3 is a functional block diagram of an image processing system 1. As shown in FIG. 3, the image processing system 1 comprises, in terms of functions, an image capturing section 100, a control section 102, a process execution section 104, an area specification data acquisition section 106, a process switching section 108, and a display section 110. These functions may be realized when the medium reading device 13 reads a program from a computer readable information storage medium into the image processing device 10, or a computer system, and further the image processing device 10 executes the program. Alternatively, the program may be downloaded to the image processing device 10 via a data communication network, such as the Internet, or the like.

In the following, details of the respective sections will be described.

The image capturing section 100 has a function for capturing an image of an object, such as a user, or the like. The image capturing section 100 has a camera 30. The camera 30 may be a digital camera, for example, for inputting a captured colored image to the image processing device 10 for every predetermined period of time (for example, 1/60 seconds).

The control section 102 controls the respective sections of the image processing device 10, and the timing at which to execute respective processes. The control section 102 is realized using the processor 12, memory 14, and operation system of the image processing device 10.

The process execution section 104 carries out a process based on the images sequentially captured by the image capturing section 100. The process execution section 104 can carry out a plurality of processes. The process execution section 104 is realized by the processor 12 operating based on a program read from a storage means, such as a memory, an information storage medium, a hard disk, or the like. These programs may include a program for carrying out an application for a game, chat, and so forth, for example. In this embodiment, the process execution section 104 has a plurality of process modes (a communication mode, an operation mode, a movement mode, and so forth) and carries out a process according to these modes.

The area specification data acquisition section 106 specifies an area where the user is shown in the captured image, based on a difference between the images sequentially captured by the image capturing section 100 (a camera). The area specification data acquisition section 106 comprises a position storage section 106A and a position coordinate update section 106B, and obtains data (hereinafter referred to as area specification data) for specifying the area where the user is shown in the captured image, based on the process carried out by the position storage section 106A and the position coordinate update section 106B.

In the following, the position storage section 106A and the position coordinate update section 106B will be described in detail.

The position storage section 106A is realized using a storage means, such as a memory 14, or the like. In the position storage section 106A, position coordinates (area specification data) of a plurality of control points are stored. These control points are placed on the edge of the area specified as showing the image of the user in the captured image, based on a difference between the images sequentially captured using the camera connected to the image processing device 10.

In the following, these control points will be specifically described with reference to FIGS. 4 and 5.

In this embodiment, a plurality of control points are placed on the upper periphery of the area where the image of the user is shown. These control points are hereinafter collectively referred to as a first control point group. The position of the user's head is specified according to the position of the first control point group.

Figure 4A:
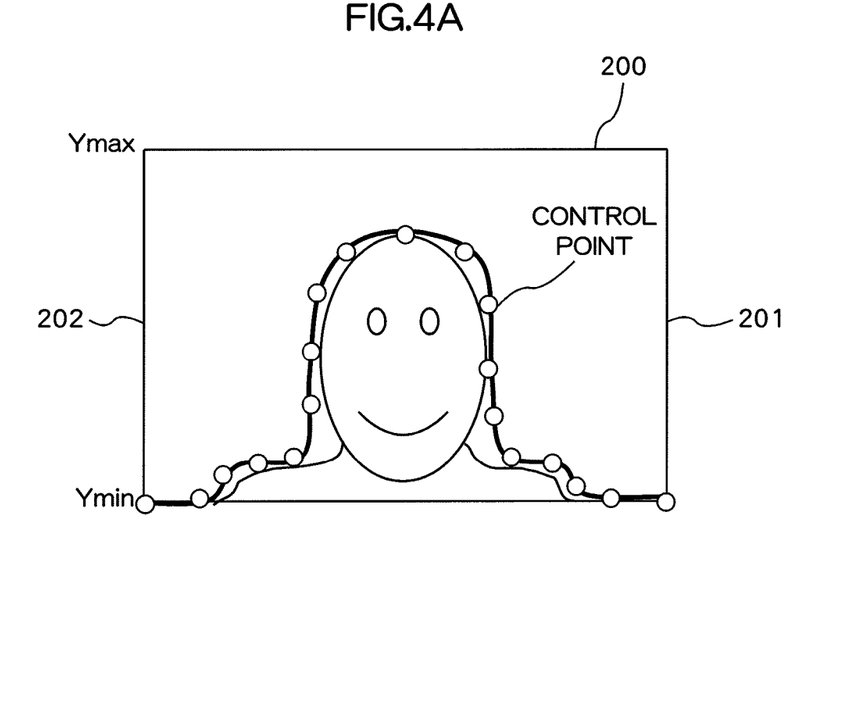
FIG. 4A is a diagram showing one example of a first control point group.
Figure 4B:
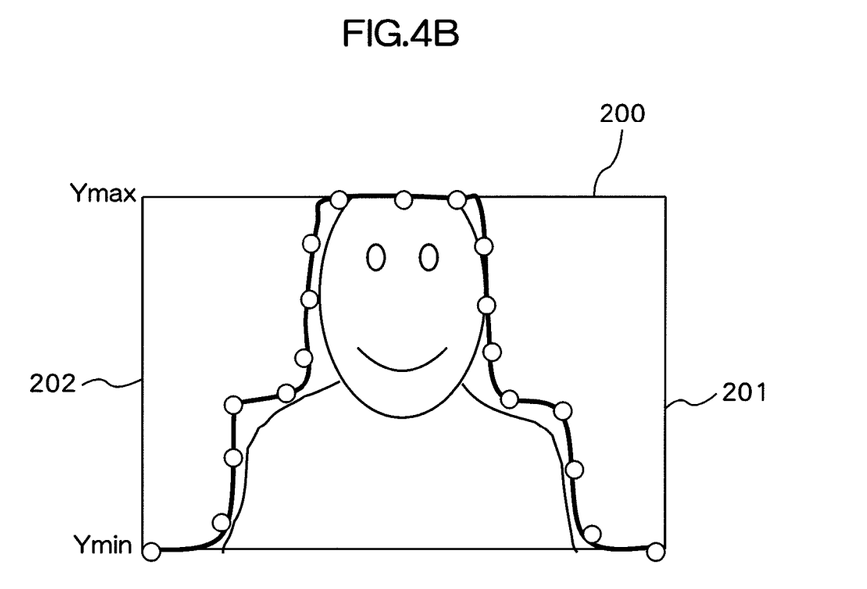
FIG. 4B is a diagram showing one example of the first control point group when the user moves upward.

FIG. 4 shows one example of the first control point group. Specifically, FIG. 4A shows the first control point group in the initial state. In this embodiment, the first control point group comprises nineteen control points, including fixed ones at both extremes of the array of the control points. This is not an exclusive example however.

The initial values of the position coordinates of the first control point group are determined as follows. That is, the user adjusts the position where they stand, the camera angle, or the like, such that the captured image of the user fits inside the screen frame. Then, the image processing device 10 carries out edge detection with the user's head fitted within the frame, and places control points on the detected edge at a predetermined interval. The control points may be placed, for example, at a constant interval in terms of the X coordinate or such that those near the extremes of the control point array can be placed at a smaller interval, while those at or near the middle of the array can be placed at a wider interval. FIG. 4B shows one example of the first control point group when the user moves upward.

In this embodiment, when an area showing a part of the user's body enters the captured image from the right and left sides thereof, a plurality of control points are placed separately from the first control point group to trace the area. These control points are hereinafter collectively referred to as a second control point group. In this embodiment, the position of the user's arm is specified based on the position of the second control point group.

Figure 5A:
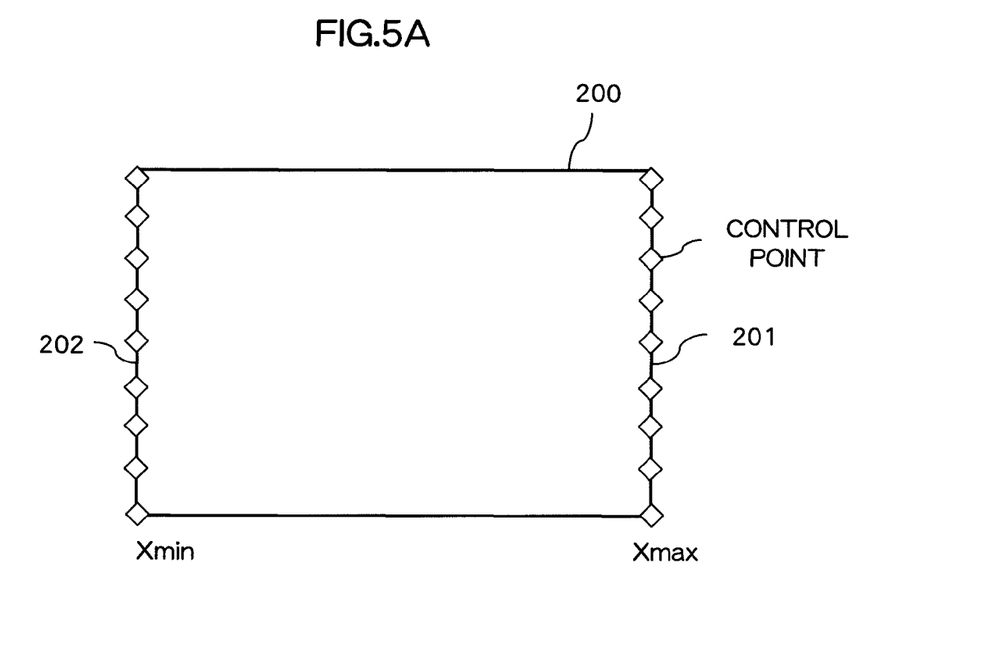
FIG. 5A is a diagram showing one example of a second control point group.
Figure 5B:
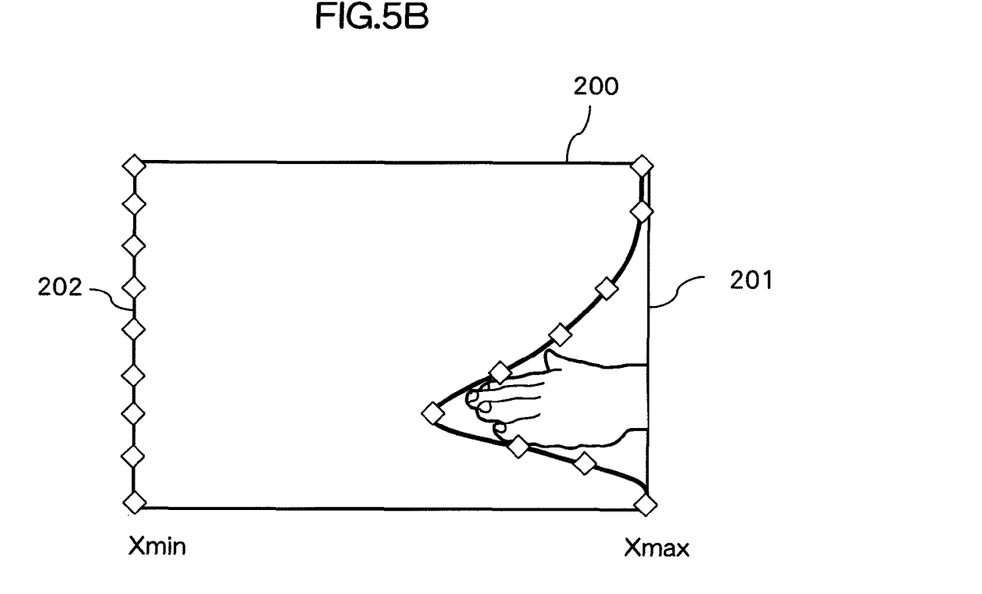
FIG. 5B is a diagram showing one example of the second control point group with the user's arm entering the captured image from the right side of the screen.

FIG. 5 shows one example of the second control point group. As shown in FIG. 5A, the second control point group comprises a plurality of control points initially placed on the right side 201 and the left side 202 of the screen, respectively. Although it is determined in this embodiment that the second control point group comprises eighteen control points, including nine placed on the left side 202 of the captured image and another nine placed on the right side 201 of the same, this is not an exclusive example. In this embodiment, the control points contained in the second control point group are placed at a constant interval in terms of the Y coordinate, as shown in FIG. 5A. FIG. 5B shows one example of the second control point group with the user's arm entering the captured image from the right side 201 of the screen. The second control point group is updated so as to trace the object entering from the right side 201 and the left side 202 of the screen, as described above. Details of the process to update the position coordinates of the second control point group will be described later.

In this embodiment, the horizontal and vertical directions in the captured image are designated using X and Y coordinates, respectively. The ranges of the X and Y coordinates are determined such that Xmin=<X=<Xmax and Ymin=<Y=<Ymax are held with the left and right extremities of the screen defined as Xmin and Xmax, respectively, and the lower and upper extremities as Ymin and Ymax, respectively. When the control point has moved to the extremity of the screen to be located on the side of the captured image, the coordinate values of the side are held for the control point.

The position coordinate update section 106B updates the position coordinates of each of the control points stored in the position storage section 106A, based on a difference between the images sequentially captured by the image capturing section 100. Specifically, the position coordinate update section 106B ranks the moving destination candidate points of each control point based on the image data sequentially input via the camera input interface 16. It should be noted here that "the moving destination candidate point of a control point" refers to a position where the control point is estimated to exist in a newly captured and input image. The moving destination candidate point of a control point may be a pixel contained in a group of pixels having a predetermined size (for example, N×N pixels) located around or in the vicinity of the control point. Based on the result of the ranking, a new position of each control point is determined.

Ranking the moving destination candidate points of a control point may be carried out using any or a combination of the five methods to be described below or any other method.

According to a first ranking method, a differential value between sequentially captured frames is obtained for each of the pixels which are moving destination candidate points of a control point, and the pixels are ranked based on the absolute values of the differential values. In the above, the moving destination candidate points of a control point are ranked, for example, in the order of an inter-frame differential value having a larger absolute value. The captured image may be converted into a binary image before the calculation of an inter-frame differential value.

According to a second ranking method, the inter-frame differential value of each of the moving destination candidate points of a control point, which is obtained using the first ranking method, is weighted. The weighting of an inter-frame differential value may be carried out based on a distance between the concerned moving destination candidate point in the current frame and the relevant control point in the previous frame. Alternatively, an estimated movement distance of a control point may be calculated based on the distribution of inter-frame differential values of the movement distance candidate points of the control point, and an increased weight may be applied to the pixel in the current frame, which is located away from the position corresponding to the control point in the previous frame, by a distance close to the estimated movement distance.

According to a third ranking method, the inter-frame differential values of each of the moving destination candidate points, which are obtained using the first ranking method, are weighted utilizing an edge. That is, an increased weight is applied to the inter-frame differential value concerning a pixel which is a moving designation candidate point and for which an edge is detected. For example, in ranking, the differential value of a pixel for which an edge is detected is multiplied by a weighting coefficient 1.0, and a pixel for which an edge is not detected is multiplied by a weighting coefficient 0.2.

According to a fourth ranking method, moving destination candidate points of a control point are ranked based on a difference between the captured image and the background image. Specifically, a background image with the user not shown therein is captured in advance and stored in the memory 14, and edge detection is carried out with respect to an image concerning the difference between the background image and the captured image, or a differential image. The edge detection is applied every frame, and an estimated movement distance of a control point between frames is calculated based on the positions of the edges found in the respective frames. A pixel for which an edge is detected may be ranked in the order of the distance between the concerned pixel and the relevant control point, closer to the estimated moving distance.

According to a fifth ranking method, with respect to each of the control points, a reference image which contains the control point is prepared in advance, and a partial image extracted from the area around or in the vicinity of the control point is compared with the reference image to determine whether or not the patterns thereof match to each other. Then, the moving destination candidate points are ranked based on the pattern matching results. For example, the reference image maybe a polygon, such as a triangle, a rectangle, or any of various other shapes, which has a control point as a vertex thereof and an area inside the closed area formed by connecting the control points contained in the first control point group.

Using any or a combination of the above-described ranking methods, all of the moving destination candidate points of all control point are ranked. Then, whether or not a moving destination candidate point group which comprises the moving destination candidate points with the highest rank of the respective control points satisfies a predetermined restriction condition is determined. When the restriction condition is satisfied, that moving destination candidates point group is determined as a new control point group. The restriction condition which should be satisfied by a moving destination candidate point group to be defined as a control point group may be such that a distance between the adjacent moving destination candidate points contained in the moving destination candidate point group falls in a predetermined permitted range.

Figure 6:
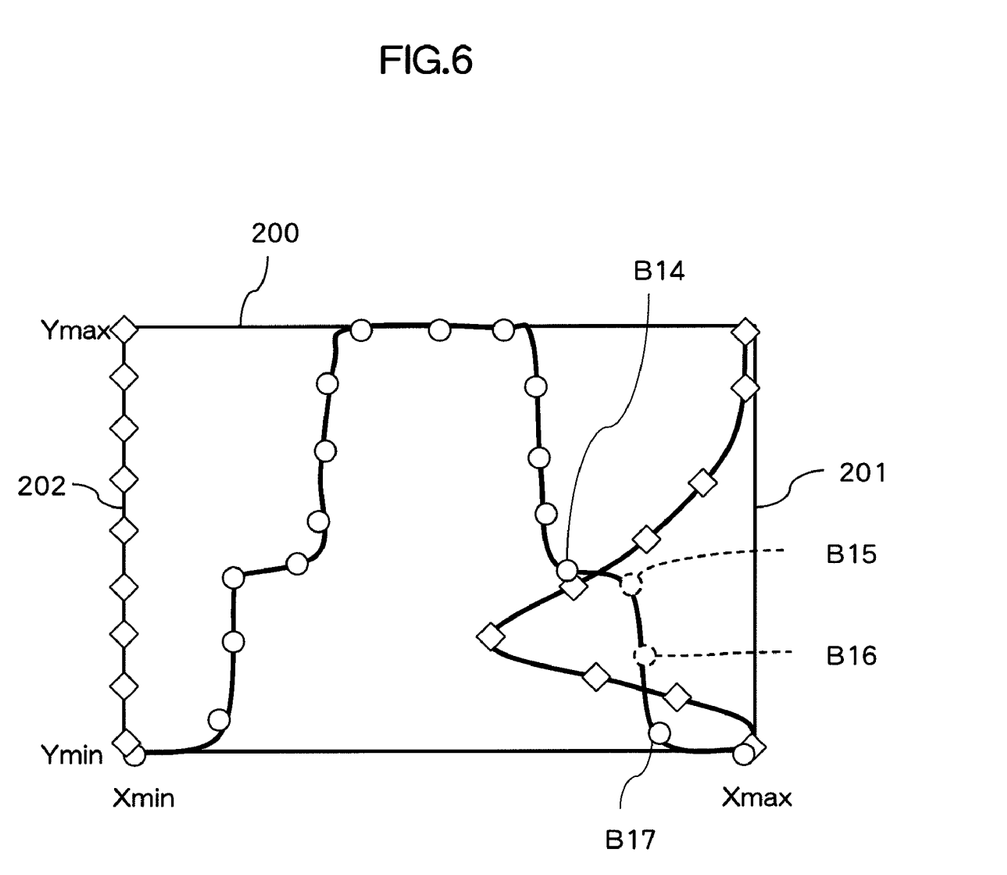
FIG. 6 is a diagram showing a control point group resulting when the user's arm overlaps their stomach.

Here, it should be noted that in the case where portions of the user's body partially overlap with each other, such as when the user's arm is located in front of their stomach, as shown in FIG. 6, the position of the control point set in the overlapped portion may be determined as described below. That is, for a control point set in the hidden portion of the user's body, the position last stored for the point may be held intact. Alternatively, the position of the control point may be obtained through interpolation using the coordinates of a control point group adjacent to the control point.

The "control point group adjacent" refers to a plurality of control points adjacent to the hidden control points, such as, in FIG. 6, the control points B14, B17 with respect to the control points B15, 16, respectively, for example. Interpolation of the position of the control point may be achieved using a publicly known interpolation method, such as linear interpolation, spline interpolation, and so forth. Alternatively, two or more control points may be used in the interpolation. Then, when the group of the control points, containing the control points obtained through the interpolation, satisfies a predetermined restriction condition which should be satisfied by a control point group, that group is determined as a control point group.

Alternatively, the last stored position may be retained for a control point relative to the portion of the user's body hidden by a different portion of the user's body, and when the predetermined restriction condition for the distance between the adjacent control points is not satisfied, interpolation using the position of the adjacent control points may be applied.

Using a program including the above-described methods, the processor 12 determines the moving destination candidate points of all control points. Then, the processor 12 overwrites the memory 14 with the position coordinate values of the determined moving destination candidate points as new position coordinates of the control points, whereby the coordinate positions of the control points are updated.

Then, the process switching section 108 switches the process to be carried out by the process execution section 104, depending on the position of the edge of the area specified by the area specification data obtained by the area specification data acquisition section 106. As described above, in this embodiment, the image processing device 10 switches the process mode depending on the position of the edge of the area specified by the area specification data.

The process switching section 108 comprises a first determination section 108A and a second determination section 108B. The first determination section 108A and the second determination section 108B carry out a given determination based on the position of the area specified by the area specification data, and the process mode is switched according to the result of the determination. In the following, the respective sections will be described in detail.

The first determination section 108A determines whether or not a first condition is satisfied, based on a distance between one side of the captured image and the edge of the area specified by the area specification data. The first condition concerns a distance between one side of the captured image and the edge of the area specified by the area specification data, and it specifically defines that the distance between the upper side of the screen and the first control point group stored in the position storage section 106A falls in a predetermined range. A determination process to be carried out by the first determination section 108A will be specifically described below.

When the first determination section 108A determines that the first condition is satisfied, the image processing device 10 determines that the user's head is not shown in the captured image. Meanwhile, when the first determination section 108A determines that the first condition is not satisfied, the image processing device 10 determines that the user's head is shown in the captured image.

For example, in this embodiment, in the case where the Y coordinate of at least one of the control points contained in the first control point group is the same as that of the upper side of the frame (Ymax), it is determined that the first condition is satisfied. Meanwhile, when there is no such control point, it is determined that the first condition is not satisfied. The first determination section 108A is realized as follows, using the hardware of the image processing device 10.

The processor 12 obtains the position coordinates of the control points contained in the first control point group stored in the memory 14. Then, the processor 12 counts the number of control points contained in the first control point group which have a Y coordinate being Ymax, or the upper extremity of the Y axis. When the counted value is zero, the processor 12 determines that the first condition is not satisfied, in other words, that the captured image shows the user's head. For the image shown in FIG. 4A, the first determination section 108A determines that the first condition is not satisfied, while for the image shown in FIG. 4B, the first determination section 108A determines that the first condition is satisfied because there are three control points contained in the first control point group, which each have the Y coordinate being Ymax.

The second determination section 108B determines whether or not the area specified by the area specification data is generated at the side of the captured image. In this embodiment, this determination is made based on the position coordinates of the second control point group stored in the position storage section 106A. A process to be carried out by the second determination section 108B will be specifically described below.

That is, in this embodiment, determination as to whether or not the area specified by the area specification data is generated at the right or left side of the image is made based on whether or not the position of the second control point group satisfies a second condition. The second condition concerns positional relationship between the second control point group and the right and left sides of the captured image. Specifically, this determination is made, for example, based on whether or not the number of control points, among those contained in the control point group and originally placed on the left side of the captured image, which move rightward passing over the predetermined left end area exceeds a threshold. This determination is also made based on whether or not the number of control points, among those contained in the control point group and originally placed on the right side of the captured image, which move leftward passing over the predetermined right end area exceeds a threshold. As a specific example in this embodiment, it is determined that the above-described area is generated at the side of the image when there is at least one control point, among those contained in the second control point group, which has an X coordinate shifting inward from the side of the captured image. The second determination section 108B is realized using the hardware of the image processing device 10 as described below.

The processor 12 obtains the position coordinates of the control points contained in the second control point group stored in the memory 14, and then counts the number of control points contained in the second control point group, and originally placed on the left side, which have an X coordinate larger than the Xmin, or the left extremity. When there is at least one such control point counted, the processor 12 determines that the user's arm (right arm) enters the captured image from the side thereof. Similarly, the number of control points, contained in the second control point group and originally placed on the right side, which have an X coordinate smaller than the Xmax, or the right extremity, is counted, and when there is at least one such control point counted, the processor 12 determines that the user's arm (left arm) enters the captured image from the side thereof.

For the captured image shown in FIG. 5A, the second determination section 108B determines that the user's arm is not shown in the captured image. On the other hand, for the captured image shown in FIG. 5B, the second determination section 108B determines that the user's arm enters the captured image from the side thereof, that is, the user's arm is shown in the captured image, because six control points among those contained in the second control point group and originally placed on the right side 201 of the captured image are found to each have an X coordinate smaller than the Xmax.

It should be noted that although the determination for the second condition by the second determination section 108B is made independently with respect to the control points placed on the left side of the captured image and those placed on the right side in the above, the determination may be made collectively with respect to the control points placed on the left and right sides of the captured image. In this case, when the number of control points contained in the second control point group, and having an X coordinate larger than a predetermined left side reference value (for example, Xmin) or smaller than a predetermined right side reference value (for example, Xmax) exceeds a predetermined threshold, it is determined that the second condition is satisfied, that is, the user's arm enters the captured image from the side thereof.

In this embodiment, according to the result of the determination by the first determination section 108A and the second determination section 108B, the process modes are switched as follows.

When the first determination section 108A determines that the first condition is satisfied, that is, the user's head is not shown in the captured image, the image processing device 10 switches the process mode to the movement mode. Meanwhile, when the first determination section 108A determines that the first condition is not satisfied, the first determination section 108a switches the process mode to the communication mode.

Further, when the second determination section 108B determines that the image capturing object (that is, the user's arm) enters the captured image from the side thereof, the image processing device 10 switches the process mode to the operation mode. When a plurality of process modes become candidates to be switched to at the same time, the operation mode has the highest priority in this embodiment. This is not an exclusive example however.

The image processing device 10 may have means for initializing the process mode set. It should be noted here that "initialization of the process mode" refers to clearing of the process mode. A process mode is initialized when, for example, an area defined by the control points contained in the second control point group and originally placed on the left side of the captured image, and that on the right side, overlap with each other.

The process switching section 108 is realized using the hardware of the image processing device 10, as described below, for example. That is, a one-bit storage area is allocated as a flag for every process mode in the memory 14 in the image processing device 10. The flag value zero indicates OFF, while the flag value one indicates ON. The processor 12 updates the flag values for the respective modes based on the result of the determination made by the first determination section 108A and the second determination section 108B. The processor 12 initially updates the flag value of the operation mode, and thereafter refers to the flag value of the operation mode in updating the flags of other process modes. That is, the processor 12 updates the flag values of other process modes when the flag value of the operation mode is zero (OFF).

In the image processing device 10, the process 12 refers to the flag values of the respective process modes ensured in the memory 14, and causes the image processing device 10 to operate in the process mode having the flag value one (ON).

The display section 110 outputs an image produced in the image processing by the image processing device 10 to the display 40.

In the following, a flow of a process to switch the process mode in the image processing device 10 will be described with reference to FIG. 7.

Figure 7:
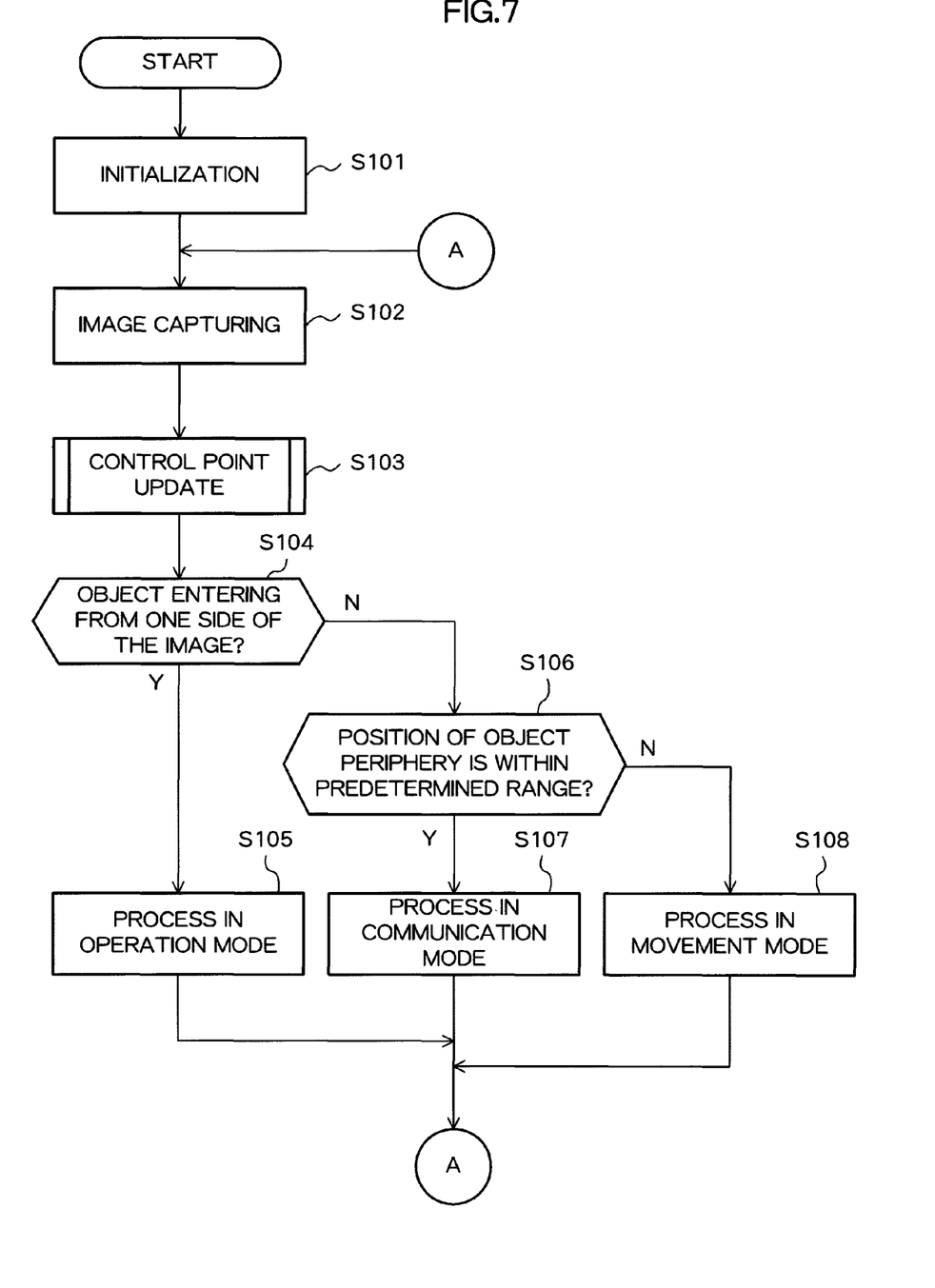
FIG. 7 is a flowchart of a switch process to be carried out by the image processing device.

As shown in FIG. 7, the image processing device 10 carries out initialization to determine the initial coordinates of a control point (S101). In the above, edge detection may be carried out with respect to the captured image of the user, so that the initial coordinates may be set based on the detected edge. Alternatively, the initial coordinates may be set based on the positional information input by the user based on the captured image shown on the display 40. The image processing device 10 may store the background images in the upper, left, and right portions in the captured image in advance in the memory. When the camera 30 completes the image capturing (S102), the image processing device 10 sequentially receives the captured images, and then updates the control point based on the sequentially captured images (S103). A process to update the control point will be described later.

Upon completion of the control point updating, the image processing device 10 determines, based on the X coordinate of the control point contained in the second control point group, whether or not the image capturing object enters the captured image from at least one of the right and left sides thereof (S104). When it is determined that the image capturing object enters the captured image from the side thereof (S104Y), the image processing device 10 switches the process mode to the operation mode (S105). Meanwhile, when no entry of the image capturing object is admitted at S104 (S104N), the image processing device 10 determines, based on the Y coordinates of the control points contained in the first control point group, whether or not the distance between the first control point group and the upper side of the captured image falls in a predetermined range (S106). When it is determined that the distance falls in the predetermined range, the image processing device 10 switches the process mode to the communication mode (S107). Meanwhile, when it is determined at S106 that the distance does not fall in the predetermined range (S106N), the image processing device 10 switches the process mode to the movement mode (S108). Thereafter, the image processing device 10 repeats the above-described process every time a captured image is input from the camera 30, or at a predetermined timing.

Figure 8:
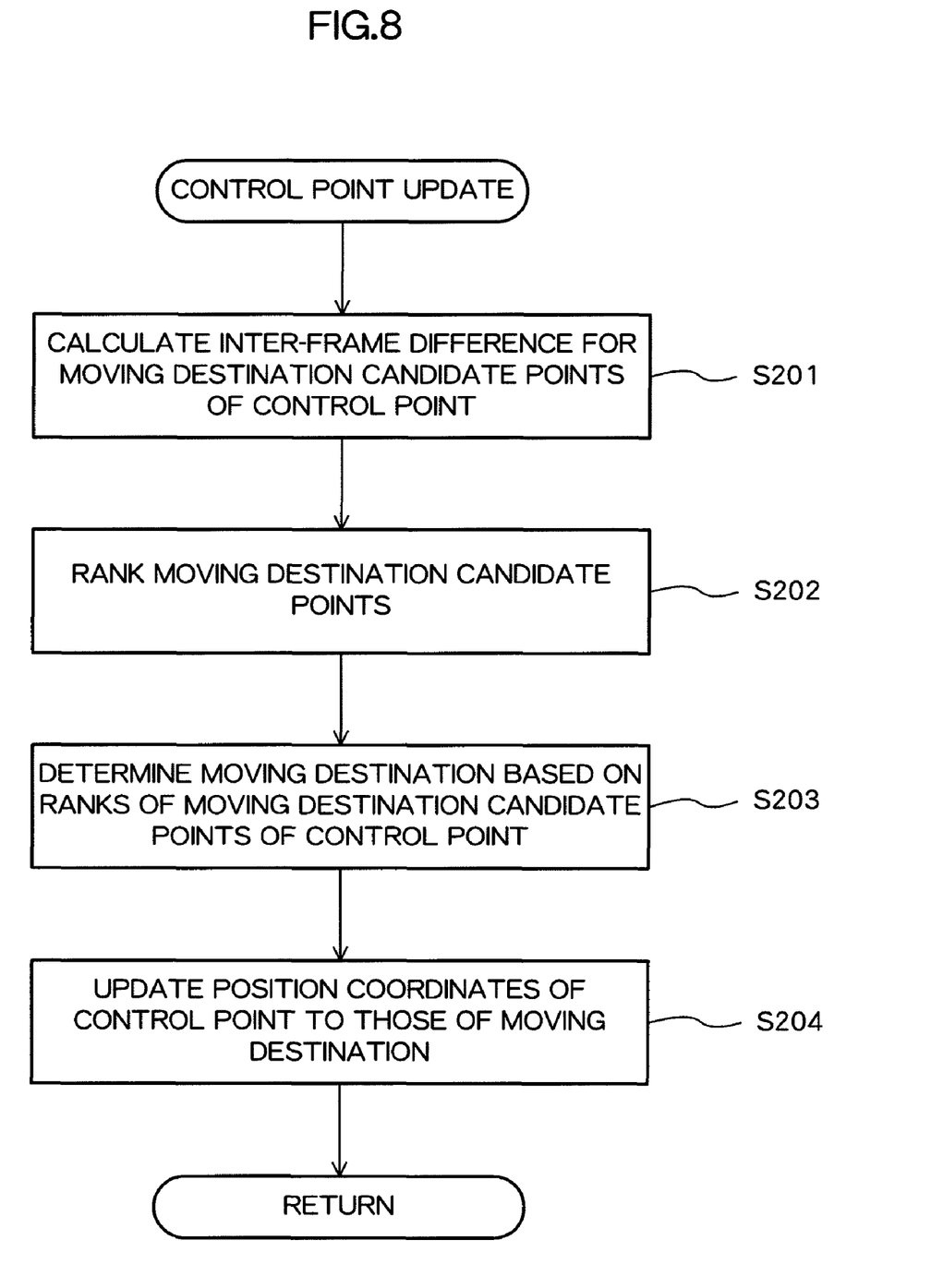
FIG. 8 is a flowchart of a process to update position coordinates of a control point.

FIG. 8 shows a flowchart of a process to update the position coordinates of a control point. As shown in FIG. 8, the image processing device 10 calculates an inter-frame difference for each of the pixels contained in the moving designation candidate area defined around or in the vicinity of the control point, based on the sequentially input captured images (S201). Then, the image processing device 10 ranks the pixels contained in the moving destination candidate point area of the control point, using a predetermined ranking method (S202).

The image processing device 10, having carried out the above-described process with respect to the remaining control points, extracts a moving destination candidate point ranked highest for each of the control points, and determines whether or not the moving destination candidate point group which contains the extracted moving destination candidate points satisfies a predetermined condition concerning a distance and positional relationship between control points. When it is determined that the group satisfies the condition, the moving destination candidate point group is determined as a new control point group (S203). The image processing device 10 updates the position coordinates of the control point based on the newly determined position of the control point, as described above (S204).

In the image processing device according to the embodiment as described above, a process to be carried out is promptly switched depending on the position of the area where the user is shown in the captured image. Therefore, the user can promptly change the process to be carried out by the image processing device by changing the position where the image of the user themselves is shown in the captured image.

It should be noted that the present invention is not limited to the above-described embodiment.

For example, although the portion of the user's body shown in the captured image is identified by carrying out image processing in the above, this is not an exclusive example of the present invention. That is, the identification may be made based on the information obtained from the hardware of the image capturing device. For example, the image processing device 10 may determine an image capturing direction adjusted by the image capturing direction adjustment section 30a of the camera 30, and identify the portion of the user's body shown in the captured image, based on the detected image capturing direction. In the above, the determination of the image capturing direction of the camera 30 may be made using a sensor, for example, for detecting the vertical and horizontal angle in which the camera 30 directs. Then, information describing association between the respective portions of the user's body and the angular ranges of the image capturing direction of the camera 30 may be stored in advance in the memory, so that the image processing device 10, while referring to the information, reads from the memory the portion of the user's body associated with the detected angle of the image capturing direction, whereby the portion of the user's body shown in the captured image is identified in this manner.

Figure 9:
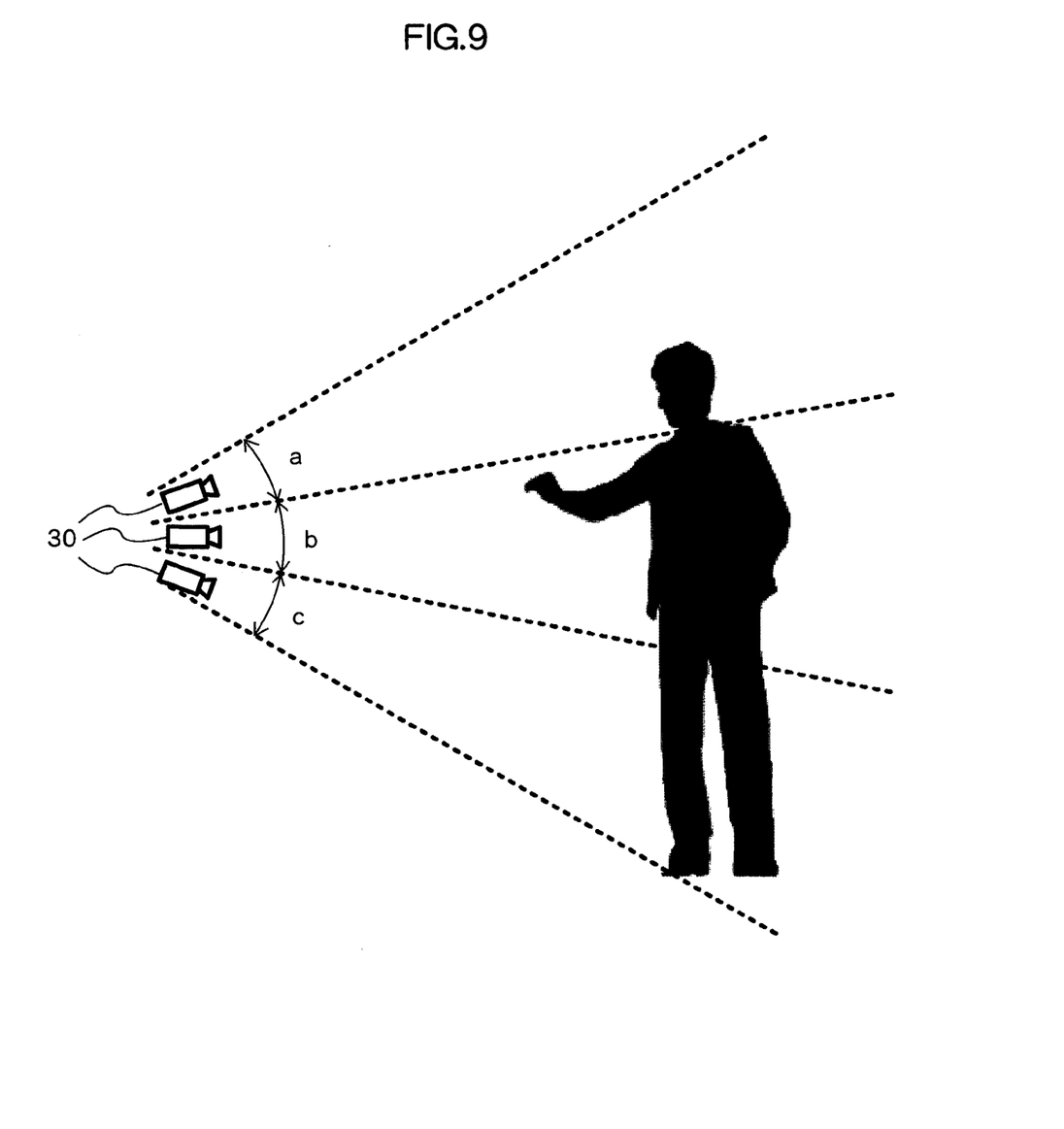
FIG. 9 is a diagram explaining a switch process to be carried out by the image processing device depending on the image capturing direction of the camera.

Specifically, when the vertical image capturing angle of the camera 30 is within the angle range a, as shown in FIG. 9, it is determined that the image of the user's face is captured. Similarly, it is determined that the image of the user's arm is captured when the image capturing angle is within the angle range b, and that the image of the user's leg is captured when the image capturing angle is within the angle range c. Alternatively, the respective portions of the user's body may be set associated with not only the vertical angular ranges but also horizontal angular ranges, so that the portion of the user's body shown in the captured image can be identified according to the combination of the angles in the vertical and horizontal image capturing directions.

What is claimed is:

1. An image processing device connected to image capturing section for sequentially capturing images of a user, comprising:

process execution section for carrying out any of a plurality of processes to be carried out based on at least one of the images sequentially captured by the image capturing section;

area specification data acquisition section for obtaining area specification data for specifying a position of an edge of the user shown in the image, based on a difference between the images sequentially captured by the image capturing section; and process switching section for switching a process to be carried out by the process execution section, depending on a distance between one side of the image and the position of the edge of the user specified by the area specification data obtained by the area specification data acquisition section.

2. The image processing device according to claim 1, wherein
the area specification data acquisition section includes
position coordinate storage section for storing, as the area specification data, position coordinates of a plurality of control points set on an edge of the area, and
position coordinate update section for updating the position coordinates of each of the control points based on a difference between the images sequentially captured by the image capturing section.

3. The image processing device according to claim 1, wherein
the process switching section
includes first determination section for determining whether or not a predetermined condition is satisfied, based on the distance between the upper side of the image and the position of the edge of the area specified by the area specification data, and
switches the process to be carried out by the process execution section, based on a result of the determination by the first determination section.

4. The image processing device according to claim 1, wherein
the process switching section
includes second determination section for determining whether or not the edge of the user specified by the area specification data is generated at the left or right side of the image, and
switches the process to be carried out by the process execution section, based on a result of the determination by the second determination section.

5. A method for controlling a computer connected to image capturing section for sequentially capturing images of a user, comprising:
a process execution step of carrying out one of a plurality of processes to be carried out based on at least one of the images sequentially captured by the image capturing section;
an area specification data acquisition step of obtaining area specification data for specifying a position of the user is shown in the image, based on a difference between the images sequentially captured by the image capturing section; and
a process switching step of switching a process to be carried out at the process execution step, depending on a distance between one side of the image and the position of the edge of the user specified by the area specification data obtained at the area specification data acquisition step.

6. A non-transitory computer-readable medium storing a program for causing a computer connected to image capturing section for sequentially capturing images of a user to function as:
process execution section for carrying out any of a plurality of processes to be carried out based on at least one of the images sequentially captured by the image capturing section;
area specification data acquisition section for obtaining area specification data for specifying a position of an edge of the user shown in the image, based on a difference between the images sequentially captured by the image capturing section; and
process switching section for switching a process to be carried out by the process execution section, depending on a distance between one side of the image and the position of the edge of the user specified by the area specification data obtained by the area specification data acquisition section.

7. An image processing system, comprising:
image capturing section for sequentially capturing images of a user; and
an image processing device,
wherein
the image processing device includes
process execution section for carrying out any of a plurality of processes to be carried out based on at least one of the images sequentially captured by the image capturing section,
captured image portion determination section for determining which portion of the user's body is shown in each of the sequentially captured images, and
process switching section for switching a process to be carried out by the process execution section, depending on the portion determined by the captured image portion determination section, wherein
the image capturing section includes an image capturing direction adjustment mechanism for adjusting an image capturing direction, and
the captured image portion determination section
includes image capturing direction detection section for detecting an image capturing direction of the image capturing section, which is adjusted by the image capturing direction adjustment mechanism, and
determines which portion of the user's body is shown in the captured image, depending on the image capturing direction detected by the image capturing direction detection section.

8. An image processing device connected to image capturing section, comprising
process execution section for carrying out any of a plurality of processes;
area specification data acquisition section for obtaining area specification data for specifying a position of an edge of a user shown in an image, based on a difference between images sequentially captured by the image capturing section; and
process switching section for switching a process to be carried out by the process execution section, depending on a distance between one side of the image and the position of the edge of the user specified by the area specification data obtained by the area specification data acquisition section.

9. A control method for a computer connected to image capturing section means, comprising:
a process execution step of executing any of a plurality of processes;
an area specification data acquisition step of obtaining area specification data for specifying a position of an edge of a user shown in an image, based on a difference between images sequentially captured by the image capturing section; and
a process switching step of switching a process to be carried out at the process execution step, depending on a distance between one side of the image and the position of the edge of the user specified by the area specification data obtained at the area specification data acquisition step.

10. A non-transitory computer-readable medium storing a program for causing a computer connected to image capturing section to function as:

process execution section for carrying out any of a plurality of processes;

area specification data acquisition section for obtaining area specification data for specifying a position of an edge of a user shown in an image, based on a difference between images sequentially captured by the image capturing section; and process switching section for switching a process to be carried out by the process execution section, depending on a distance between one side of the image and the position of the edge of the area specified by the area specification data obtained by the area specification data acquisition section.

11. An image processing system comprising:

image capturing section; and image processing device, wherein the image processing device includes process execution section for carrying out any of a plurality of processes;

area specification data acquisition section for obtaining area specification data for specifying a position of an edge of a user shown in an image, based on a difference between images sequentially captured by the image capturing section; and process switching section for switching a process to be carried out by the process execution section, depending on a distance between one side of the image and the position of the edge of the user specified by the area specification data obtained by the area specification data acquisition section.

* * * * *